United States Patent [19]
Tsuyuguchi

[11] Patent Number: 4,918,743
[45] Date of Patent: Apr. 17, 1990

[54] CIRCUIT FOR GENERATING A DUAL PURPOSE CONTROL SIGNAL IN A DISK APPARATUS

[75] Inventor: Hiroshi Tsuyuguchi, Tokyo, Japan
[73] Assignee: Teac Corporation, Tokyo, Japan
[21] Appl. No.: 262,958
[22] Filed: Oct. 26, 1988
[30] Foreign Application Priority Data
Nov. 13, 1987 [JP] Japan ................. 62-287127
[51] Int. Cl.$^4$ ............................. G05B 5/00
[52] U.S. Cl. ................. 388/812; 388/908; 388/815; 360/73.03
[58] Field of Search ......... 318/306, 309–317, 318/329; 360/73.01, 73.03, 73.09, 71; 388/803–805, 809–815, 819–822, 828–829, 830–833, 908

[56] References Cited
U.S. PATENT DOCUMENTS

| | | | |
|---|---|---|---|
| 4,211,964 | 7/1980 | Yabu et al. ................. | 388/812 |
| 4,484,235 | 11/1984 | Yokobori et al. ............ | 388/812 X |
| 4,490,755 | 12/1984 | Tokuyama .................. | 360/73.09 X |
| 4,675,855 | 6/1987 | Iso et al. .................... | 360/73.03 X |
| 4,695,781 | 9/1987 | Ito ............................ | 360/73.09 X |
| 4,710,825 | 12/1987 | Okita et al. ................. | 388/812 X |
| 4,734,630 | 3/1988 | Okano ....................... | 388/812 X |
| 4,736,263 | 4/1988 | Takahashi et al. ........... | 360/73.03 |
| 4,739,230 | 11/1986 | Sonobe et al. ............... | 388/812 |
| 4,789,975 | 12/1988 | Taniyama .................... | 360/73.03 X |

Primary Examiner—William M. Shoop, Jr.
Assistant Examiner—David Martin
Attorney, Agent, or Firm—Woodcock, Washburn, Kurtz, Mackiewicz & Norris

[57] ABSTRACT

A magnetic or optical disk apparatus featuring a circuit for generating a dual implication MOTOR STATUS signal in response to a MOTOR SPEED signal representative of the speed of rotation of a disk drive motor and to a MOTOR ON signal dictating the rotation and nonrotation of the disk drive motor. The MOTOR STATUS signal indicates: (1) the rotation of the disk drive motor at a desired normal speed, enabling data transfer between the disk and a head; and (2) the slowing down of the motor to a predetermined speed close to zero. The two implications of the MOTOR STATUS signal can be distinguished from each other by reference to the MOTOR ON signal. The first implication may be used to enable reading or writing of data on the disk, and the second implication for disk ejection and for opening a power switch or switches, among other purposes.

15 Claims, 4 Drawing Sheets

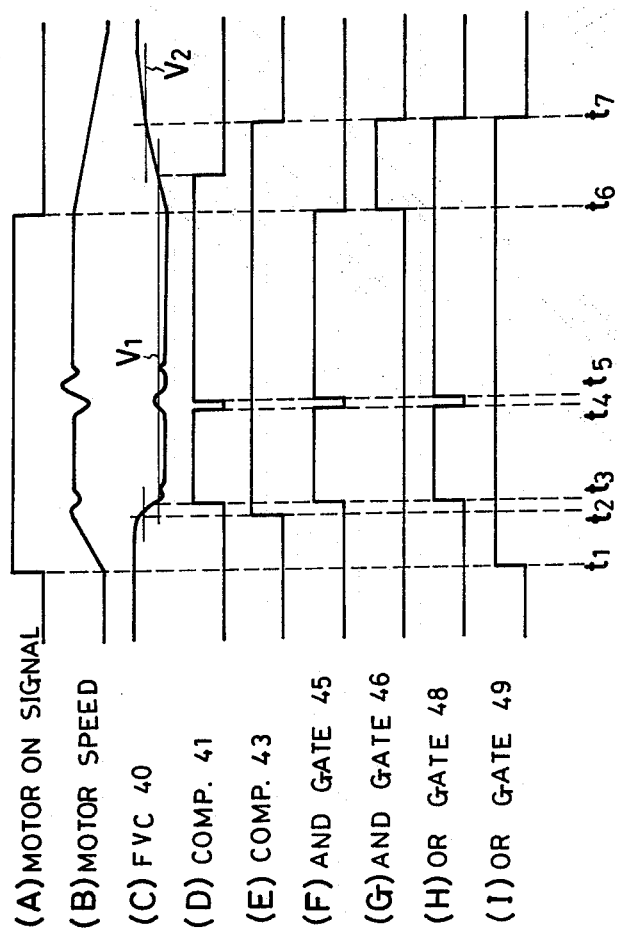

CIRCUIT FOR GENERATING A DUAL PURPOSE CONTROL SIGNAL IN A DISK APPARATUS

BACKGROUND OF THE INVENTION

My invention relates generally to data transfer apparatus employing disklike record media such as magnetic or photomagnetic disks for reading and/or writing data thereon. More specifically, my invention deals with circuit means in such apparatus for generating a dual implication control signal which represents the states of a disk drive motor and which is used for controlling some other parts of the apparatus.

In the art of data transfer with a disklike record medium, it is essential that the disk be in rotation at a prescribed constant speed or accurately reading or writing date thereon. The need arises, therefore, for ascertaining the moment the disk attains the constant speed after being set into rotation in response to a MOTOR ON signal, in order to commence data transfer at the earliest possible moment. The so called READY signal indicates disk rotation at the normal speed. the WRITE GATE signal permits writing on th disk.

However, being indicative only of disk rotation at the normal speed, the READY signal cannot possibly be relied upon for the determination of moments for automatic disk ejection following the end of reading or writing, or for automatically opening a power switch or switches built into the apparatus for deenergizing some of its components. Conventionally, therefore, a timer has been employed for measuring time after the MOTOR ON signal dictates the nonrotation of the disk drive motor, or a circuit has been provided for detecting the fact that the motor has come to a stop.

I object to the conventional practice of using two or more separate control signals for the noted timing purposes. If the means for generating such control signals are incorporated in an integrated circuit, as is often the case in the disk drive art, then the integrated circuit must have as many output terminals for separately delivering them to the required parts of the apparatus. The number of terminals of an integrated circuit should be as small as possible for the ease of fabrication of connection to the other parts of the complete circuitry.

SUMMARY OF THE INVENTION

I have hereby in vented, in an apparatus for data transfer with a disklike record medium, a novel circuit arrangement whereby a dual implication MOTOR STATUS signal is generated to make possible various controls of the apparatus at appropriate moments in time.

Briefly, my invention provides, in an apparatus for data transfer with a disklike record medium, the combination comprising a disk drive motor for imparting rotation to the record medium, speed sensor means for providing a MOTOR SPEED signal representative of the speed of rotation of the record medium, and signal supply means for supplying a MOTOR ON signal dictating the rotation and nonrotation of the disk drive motor. Motor control and drive means set the disk drive motor into rotation when the MOTOR ON signal dictates its rotation, and drives the disk drive motor at a prescribed normal speed for data transfer in response to the MOTOR SPEED signal. Also included in a MOTOR STATUS signal generator circuit coupled to both the speed sensor means and the signal supply means for generating a dual implication MOTOR STATUS signal in response to the MOTOR SPEED signal and the MOTOR ON signal.

The MOTOR STATUS signal has first and second prescribed states and is in: (1) the first prescribed state when the MOTOR ON signal dictates the rotation of the disk drive motor and when, at the same time, the disk drive motor is in rotation at a first reference speed which is substantially equal to the normal speed; (2) the first prescribed state when the MOTOR ON signal dictates the nonrotation of the disk drive motor and when, at the same time, the disk drive motor is in rotation at less than the first reference speed and more than a second reference speed which is less than the first reference speed; (3) the second prescribed state when the MOTOR ON signal dictates the rotation of the disk drive motor and when, at the same time, the disk drive motor is in rotation at less than the first reference speed; and (4) the second prescribed state when the MOTOR ON signal dictates the nonrotation of the disk drive motor and when, at the same time, the disk drive motor is out of rotation or in rotation at not more than the second reference speed.

Let us assume that the first prescribed state is high, and the second prescribed state low. The dual implication MOTOR STATUS signal generated in accordance with my invention is high when either (1) the disk drive motor is in rotation substantially at the prescribed normal speed; or (2) the motor is slowing down from the normal speed to the second reference speed which I understand is set close to zero. These two possible states of the motor can be readily distinguished from each other as the MOTOR STATUS signal is compared with the MOTOR ON signal. Thus, when the MOTOR STATUS signal is high, the motor is in constant rotation if the MOTOR ON signal is also high, and is slowing down if the MOTOR ON signal is low.

It will therefore be understood that the MOTOR STATUS signal can be relied upon for timing the various control functions that must be performed within the data transfer apparatus. For example, data may be recorded on or reproduced from the disklike medium when the MOTOR STATUS and MOTOR ON signals are both high. Further, since the MOTOR STATUS signal goes low when the motor slows down to the second reference speed close to zero, the signal can also be utilized for timing the actuation of a disk ejector, the opening of a power switch or switches, etc.

The above and other features and advantages of my invention and the manner of realizing them will become more apparent, and the invention itself will best be understood, from a study of the following description and appended claims, with reference had to the attached drawings showing some preferable embodiments of my invention.

BRIEF DESCRIPTION OF THE DRAWINGS

FIG. 4, consisting of (A) through (I), is a waveform diagram showing in proper time relationship to each other the signals which appear in the various parts of the FIG. 3 apparatus and which are useful in explaining its operation.

DESCRIPTION OF THE PREFERRED EMBODIMENTS

Figure 1:
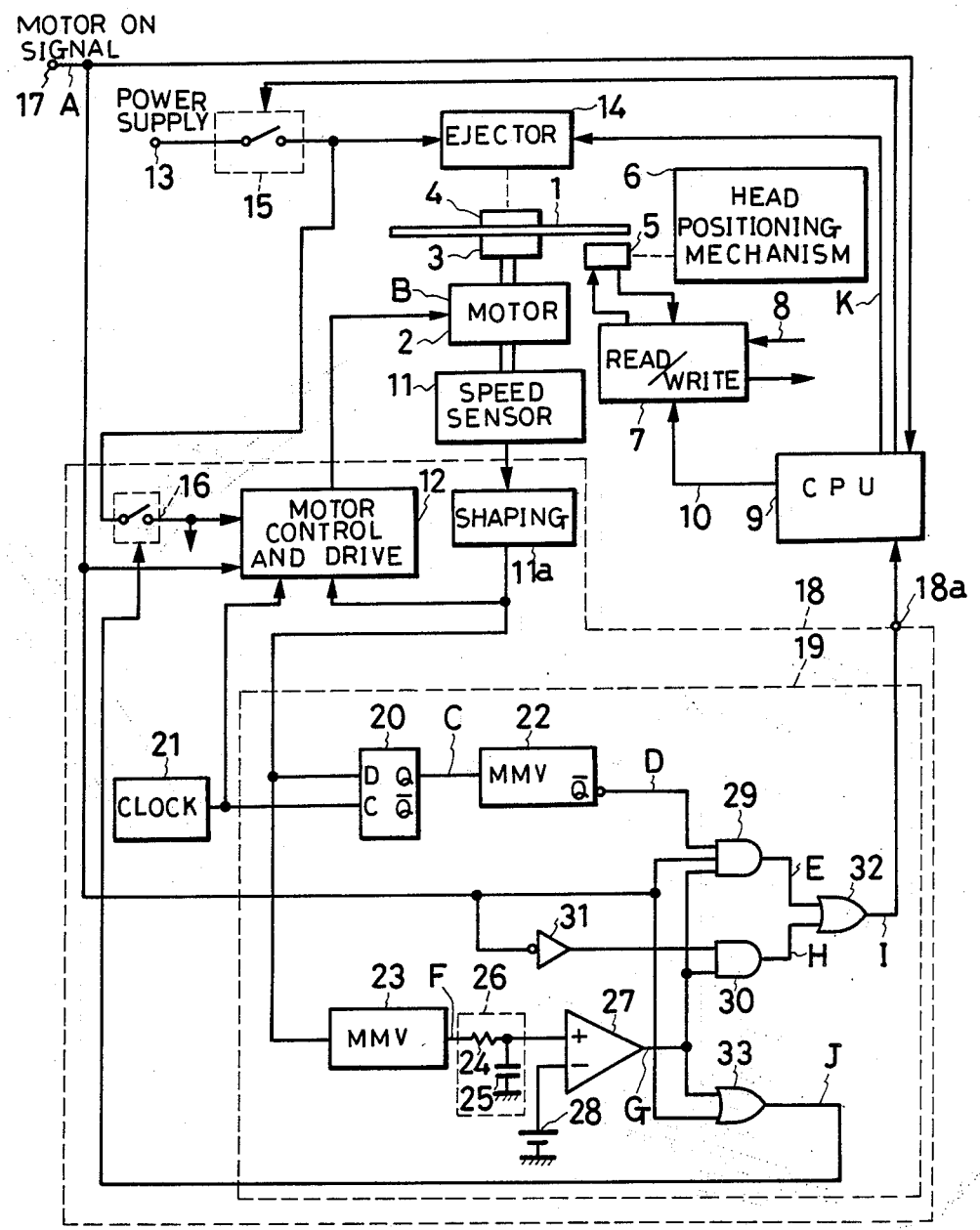
FIG. 1 is a block diagram schematically illustrating the data transfer apparatus embodying the novel concepts of my invention, the apparatus being herein shown adapted for optical data transfer with a photomagnetic record disk.

I will now describe my invention in detail as embodied in the data transfer apparatus of FIG. 1 employing a photomagnetic disk 1 as a record medium. In the course of the following detailed discussion of FIG. 1 apparatus I will refer also to FIG. 2 which plots at (A) through (K) the signals useful in understanding the operation of the apparatus. I have indicated in FIG. 1 the parts where the signals (A)–(K) of FIG. 2 appear, by the same capitals.

The photomagnetic record disk 1 is concentrically mounted on a turntable 3 of much smaller diameter. A clamp 4 releasably clamps the disk 1 to the turntable 3. A disk drive motor 2 has its armature shaft coupled directly to a turntable 3 for imparting rotation to the disk 1 clamped thereon.

Disposed close to the underside of the disk 1 on the turntable 3, an optical read/write head 5 emits both a modulated write beam and an unmoudlated read beam toward the disk. For reading data from the disk 1 the head 5 is irradiated by the reflection of the read beam from the disk surface. A head positioning mechanism 6 is mechanically coupled to the head 5 for transporting the same more or less radially of the disk 1. The rotation of the disk 1 and the more or less linear travel of the head 5 combine to create the relative scanning motion of the disk surface by the head.

A read/write circuit 7, electrically coupled to the head 5, performs two important functions. First, in response to a WRITE DATA signal supplied over a line 8, the read/write circuit 7 delivers a beam modulating signal to the head 5, enabling the head to emit the write beam which is modulated in accordance with the data to be written on the disk 1. Second, it creates a READ DATA signal in response to the read output from the head 5. A central processor unit (CPU) is connected to the read/write circuit 7 by a line 10 for delivering thereto a WRITE GATE signal controlling the writing of data on the disk 1.

For the constant speed rotation of the disk drive motor 2, and hence of the disk 1, there are prosvided a speed sensor 11, a shaping circuit 11a and a motor control and drive circuit 12. Mechanically coupled to the armature shaft of the disk drive motor 2, the speed sensor 11 puts out a MOTOR SPEED signal in the form of a series of pulses at a repetition rate representative of the speed of motor rotation. These MOTOR SPEED pulses are fed to the motor control and drive circuit 12 after being reshaped by the shaping circuit 11a. A clock 21 is also connected to the motor control and drive circuit 12 and supplies a series of accurately timed clock pulses thereto for synchronization. As is conventional in the art, the motor control and drive circuit 12 constantly compares the MOTOR SPEED pulses with the clock pulses and controllably energizes the disk drive motor 2 so as to maintain a predetermined phase relationship between the MOTOR SPEED pulses and the clock pulses. The disk drive motor 2 is locked in rotation at the prescribed constant speed when the MOTOR SPEED pulses are in synchronism with the clock pulses.

Also connected to the motor control and drive circuit 12 is a MOTOR ON signal input terminal 17 for inputting a MOTOR ON signal, FIG. 2(A), from a host system, not shown, of conventional design which controls the operation of this disk apparatus in the known manner. Alternatively, instead of connecting the terminal 17 to the host system, the MOTOR ON signal may be supplied by the manual activation of a switch. The motor control and drive circuit 12 is to drive the disk drive motor 2 at the desired normal speed only when the MOTOR ON signal is high. I understand that the motor control and drive circuit 12 is conventionally constructed for braking the disk drive motor 2 to a quick stop when the MOTOR ON signal goes low.

At 13 is seen a common supply terminal for feeding power to the various parts of this data transfer apparatus. The supply terminal 13 is herein shown connected to a disk ejector 14 via a power switch 15 and, via an additional power switch 16, to the motor control and drive circuit 12 and to the various parts of a motor control network shown enclosed by the dashed lines designated 18. The first recited power switch 15 is turned on and off by the CPU 9. The disk ejector 14 conventionally operates to unclamp and eject the disk 1 under the control of the CPU 9. Although I have shown only one supply terminal 13 in this embodiment, in practice there may be provided two such terminals, one for supplying a relatively high voltage to the motor control and drive circuit 12, ejector 14, etc., and the other for supplying a lower voltage to the CPU 9, etc.

The motor control network 18, which may take the form of an integrated circuit in practice, comprises a MOTOR STATUS signal generator circuit 19 forming the gist of my invention, in addition to the shaping circuit 11a, motor control and drive circuit 12, second power switch 16 and clock 21. I have named the MOTOR STATUS signal generator circuit so because its primary purpose is to generate the dual implication MOTOR STATUS signal, FIG. 2(I), representative of the states of the disk drive motor 2 in accordance with my invention. In this embodiment, however, the MOTOR STATUS signal generator circuit 19 additionally comprises means for generating a MOTOR OFF signal, FIG. 2(J), to be applied to the second power switch 16 for its on-off control. The MOTOR OFF signal serves to disconnect the motor control and drive circuit 12 from the supply terminal 13 later than the MOTOR ON signal dictates the nonrotation of the disk drive motor 2 but earlier than the CPU 9 opens the first power switch 15.

The MOTOR STATUS signal generator circuit 19 includes a D flip flop 20 having its data input D coupled to the shaping circuit 11a, its clock input C to the clock 21, and its Q output to a retriggerable monostable multivibrator (MMV) 22. Therefore, as will be understood from (B) and (C) in FIG. 2, the Q output of the flip flop 20 will remain high when the MOTOR SPEED pulses are synchronized with the clock pulses, that is, when the disk drive motor 2 is locked in rotation at the desired constant speed. When the motor speed is fluctating, on the other hand, the flip flop 20 will produce a series or relatively short duration pulses from its Q output.

Retriggered by the short duration output pulses of the flip flop 20, the MMV 22 will produce a low output as long as the motor speed is fluctuating, as indicated at FIG. 2(D). It will also be noted from FIG. 2(D) that the MMV 22 will remain high as the disk drive motor 2 attains the desired normal speed. Thus the output from the MMV 22 represents whether the disk drive motor 2 is in rotation at the prescribed normal speed or not.

The MOTOR STATUS signal generator circuit 19 includes a second retriggerable MMV 23 which has its input coupled directly to the shaping circiut 11a. Consequently, as the motor speed varies as FIG. 2(B), the output from the second MMV 23 will become high either intemittently or continuously, as drawn at FIG. 2(F). The second MMV 23 has its output coupled to the noninverting input of a comparator 27 via a low pass filter 26 comprising a resistor 24 and a capacitor 25.

The comparator 27 has its inverting input coupled to a reference voltage sources 28. Accordingly, as seen at FIG. 2(G), the output from the comparator 27 is high when the output magnitude of the low pass filter 26 is higher than the reference voltage. This reference voltage is so determined that the output from the comparator 27 is high when the speed of rotation of the disk drive motor 2 is above a predetermined reference speed that is very much closer to zero than to the normal speed at which the motor is desired to be in constant rotation during the progress of data transfer between disk 1 and head 5. In other words, the comparator 27 goes low when the motor slows down to the reference speed determined by the reference voltage source 28.

An AND rage 29, also includes in the MOTOR STATUS signal generator circuit 19, has a first input connected to the first MMV22, a second input to the MOTOR ON input terminal 17, and a third input to the comparator 27. Another AND gate 30 has a first input connected to the MOTOR ON input terminal 17 via a NOT circuit 31, and a second input to the comparator 27. The outputs of the two AND gates 29 and 30 are both connected to an OR gate 32. The output of the OR gate 32 is coupled to the CPU 9 via the output 18a of the motor control network 18. The signal thus fed from the OR gate 32 to the CPU 9 is what I call the MOTOR STATUS signal, which is represented at FIG. 2(I).

The MOTOR STATUS signal generator circuit 19 includes another OR gate 33 having a first input connected to the comparator 27 and a second input to the MOTOR ON input terminal 17. The output of the second OR gate 33 is coupled to the second power switch 16 for applying thereto the noted MOTOR OFF signal seen at FIG. 2(J).

OPERATION

The MOTOR ON signal of FIG. 2(A) may be supplied either automatically from the unshown host system or by the mannual actuation of the unshown MOTOR ON switch. As the MOTOR ON signal goes high at a time t1, the CPU 9 will respond by closing the first power switch 15. The OR gate 33, shown included in the MOTOR ON signal, as at FIG. 2(J), by closing the second power switch 16 connected in series with the first power switch 15. Now, fed from the supply terminal 13 via the two closed power switches 15 and 16, the motor control and drive circuit 12 will energize the disk drive motor 2.

As the disk 1 is thus set onto rotation by the disk drive motor 2 at the time t1, the speed sensor 11 will put out the motor speed pulses at a rate determined by the speed of motor rotation. In putting these MOTOR SPEED pulses via the shaping circuit 11a, and the clock pulses from the clock 21, the motor control and drive circuit 12 will start controlled energization of the disk drive motor 2. The motor will be locked in rotation at the desired normal speed upon synchronization of the MOTOR SPEED pulses with the clock pulses.

As represented analogously at FIG. 2(B), it will take some time before the disk drive motor 2 attains the constant speed after t1. During this period of motor acceleration the flip flop 20 will deliver a series of pulses, as at FIG. 2(C), at sufficiently short intervals to retrigger the first MMV 22. Accordingly, as shown at FIG. 2(D), the first MMV 22 will remain from t2 to t3 and then will go high as the disk drive motor 2 because locked into rotation at the required speed at t3.

Directly inputting the MOTOR SPEED pulses from the shaping circuit 11a, the second MMV 23 will produce the output seen at FIG. 2(F). It will be seen that the second MMV 23 puts out discrete pulses when the motor speed is low, and gains a sustained high state when the motor speed builds up sufficiently high. This output from the second MMV 23 is directed into the low pass filter 26 thereby to be converted into a voltage signal representative of the motor speed. The comparator 27 compares this output voltage of the low pass filter 26 with the reference voltage from the source 28. The reference voltage is set approximately equal to the filter output voltage corresponding to the noted reference speed close to zero. Accordingly, as will be understood from FIG. 2(G) taken together with FIG. 2(B), the comparator 27 will go high at the time t2 immediately following the time t1 when the motor 2 is set into rotation, and will go low at a time t7 immediately preceding a time t8 when the motor comes to a standstill.

Figure 2:
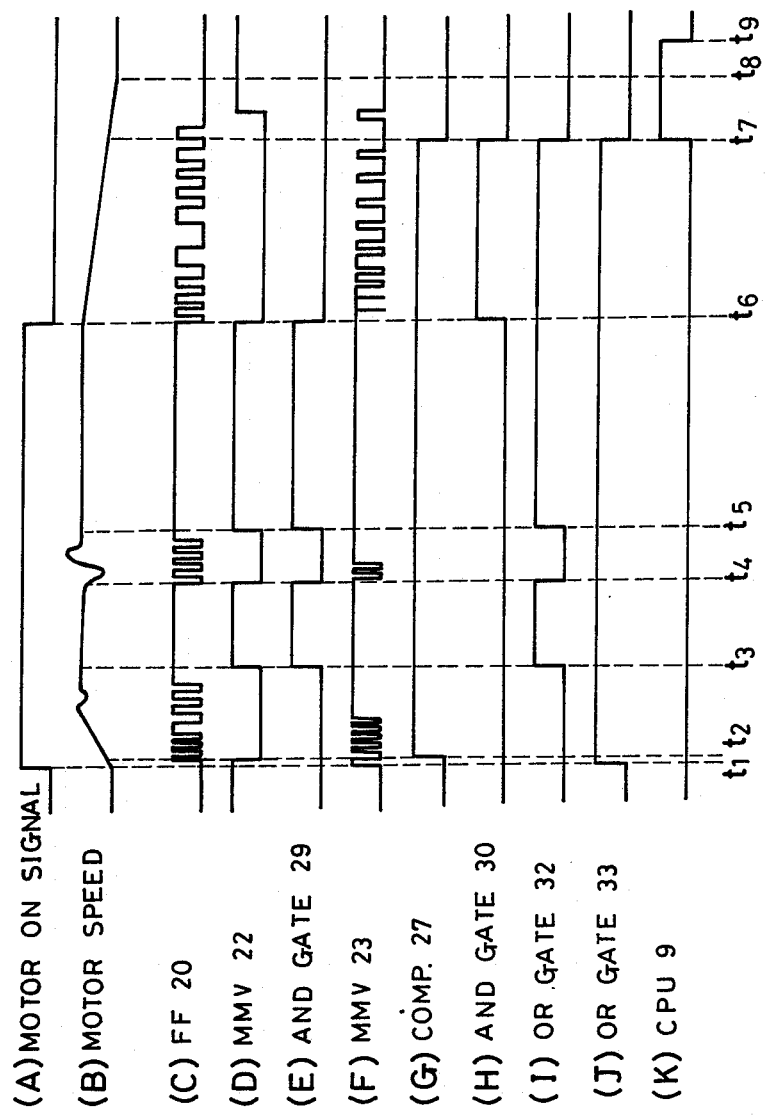
FIG. 2. consisting of (A) through (K), is a waveform diagram showing in proper time relationship to each other the signals which appear in the various parts of the FIG. 1 apparatus and which are useful in explaining its operation.

As will be understood upon inspection of (A), (D) and (G) in FIG. 2, as well as FIG. 1, all the inputs to the first AND gate 29 of the MOTOR STATUS signal generator circuit 19 becomes high at the time t3, so that this AND gate will go high at this time, as at FIG. 2(E). Thus, as this high output from the AND gate 29 is fed to the OR gate 32, the output therefrom (MOTOR STATUS signal) will go high at the time t3, as at FIG. 2(I). I have shown at FIG. 2(B) that the motor speed fluctuates during the time interval of t4–t5 for some external disturbance, in order to explain the resulting operation of the MOTOR STATUS signal general circuit 19. Then the flip flop 20 will produce a series of short duration pulses during this time interval, as at FIG. 2(C), with the result that the first MMV 22, and therefore the AND gate 29, will go low as at (D) and (E) in FIG. 2. The MOTOR STATUS signal puts out by the OR gate 32 will therefore be low from t4 to t5, as at FIG. 2(I), indicating that the disk drive motor is not in rotation at the desired constant speed.

However, provided that this time interval t4–t5 is not too long, the drop in the output voltage of the low pass filter 26 will be so small that the output from the comparator 27 will remain high as at FIG. 2(G). Thus the MOTOR OFF signal of FIG. 2(J), put out by the second OR gate 33, will also remain high, holding the second power witch 16 closed and thereby permitting the motor control and drive circuit 12 to be fed continuously from the supply terminal 13.

The MOTOR ON signal is shown to go low at a subsequest time t6 whereupon the motor control and drive circuit 12 will initiate the braking control of the disk drive motor 2 for a quick stop, as is conventional in the art. Generally, the braking control involves the reverse energization of the motor for a preassigned time, and the application of a brake, not shown, on some part rotating with the disk 1. The motor will nevertheless slow down gradually, rather than coming to an abrupt stop, as indicated at FIG. 2(B).

As the disk drive motor 2 is unlocked from its constant speed rotation at the time t6, the flip flop 20 will start producing discrete pulses as at FIG. 2(C). The first MMV 22 will then go low as at FIG. 2(D), so that the first AND gate 29 will also go low as at FIG. 2(E). The MOTOR STATUS signal will remain high, however, because of the following operation of the MOTOR STATUS signal generator circuit 19.

As will be noted from FIG., 2(G), the comparator 27 will remain high until a time t7 when the disk drive motor 2 slows down to the reference speed shortly before coming to a complete stop at the time t8. This sustained high output from the comparator 27 is fed to the second AND gate 30, to which is also supplied the inversion of the MOTOR ON signal from the input terminal 17 via the NOT circuit 31. The output from the second and gate 30 will therefore be high from t6 to t7 as at FIG. 2(H). The first OR gate 32 permits the passage therethrough of both the FIG. 2(E) output from the first AND gate 29 and the FIG. 2(H) output from the second AND gate 30. The resulting output from the first OR gate 32, the MOTOR STATUS signal, is therefore as represented at FIG. 2(I).

It will be understood from FIG. 2(I) that the MOTOR STATUS signal is high when: (1) the disk drive motor 2 is locked in constant speed rotation, as from t3 to t4 and form t5 to t6; or (2) the motor is under braking control, that is, rapidly decelerating from its normal speed to the reference speed close to zero, as from t6 to t7.

Distinction must then be made from the high state of the MOTOR STATUS signal whether the motor is locked in constant rotation or is under braking control, in order to enable the CPU 9 to control the read/write circuit 7, ejector 14, first power switch 15, etc., accordingly. The CPU 9 can readily distinguish between the two possible states as it inputs both the MOTOR STATUS signal form the generator circuit 19 and the MOTOR ON signal from the input terminal 17. The disk drive motor 2 is locked in constant rotation when the MOTOR STATUS and MOTOR ON signals are both high, and is under braking control when the MOTOR STATUS signal is high whereas the MOTOR ON signal is low.

By making such distinction the CPU 9 will, for example, deliver the WRITE GATE signal to the read/write circuit 7, enabling the same to write desired data on the disk 1, when the motor is locked in constant rotation as from t3 to t4 or from t5 to t6. Then, at the time t7 when the MOTOR STATUS signal goes low, the CPU 9 will deliver an eject pulse, seen at FIG. 2(K), to the ejector 14 thereby causing the same to unclamp and eject the disk 1. Further, upon extinction of the eject pulse at a time t9, the CPU 9 will open the first power switch 15.

Desirably, in order to save power, the disk drive motor 2 should be deenergized earlier than the opening of the first power switch 15 at the time t9. I have therefore incorporated the second OR gate 33 in the MOTOR STATUS signal generator circuit 19 in order to provide the MOTOR OFF signal which serves that purpose. As seen at FIG. 2(G), the comparator 27 will go low at the time t7 when the motor 2 slows down to the reference speed close to zero. Since then the second OR gate 33 will also go low as at FIG. 2(J), the MOTOR OFF signal will open the second power switch 16 to disconnect the motor control and drive circuit 12 from the supply terminal 13, it being understood that the first power switch 15 is still open at this time.

The data transfer apparatus of FIG. 1 gains the following advantages:

1. The signal of FIG. 2(E), indicative of the constant speed rotation of the motor, and the signal of FIG. 2(H), indicative of the braking control period of the motor, are combined to provide the dual implication MOTOR STATUS signal of FIG. 2(I). Consequently, the motor control network 18, which can be fabricated in the form of an integrated circuit in practice, needs only one terminal 18a for putting out the MOTOR STATUS signal, instead of two terminals for separately putting out the signals of FIGS. 2(E) and 2(H).

2. The CPU 9 actuates the ejector 14 at the time t7 when the MOTOR STATUS signal goes low, as at FIG. 2(I), and when the motor speed becomes sufficiently low. There is accordingly no hazard of the ejector being actuated during the forced rotation of the motor.

3. The braking control of the disk drive motor 1 by reverse energization becomes possible as the second power switch 16, associated with the motor control and drive circuit 19, is opened by the MOTOR OFF signal at the time t7 when the motor sufficiently slows down, rather than at the t6 when the MOTOR ON signal goes low.

4. Power is saved as the two power switches 15 and 16 are opened at the earliest possible moments, as noted above, which have been chosen from the standpoint of the optimal operation of apparatus.

SECOND FORM

Figure 3:
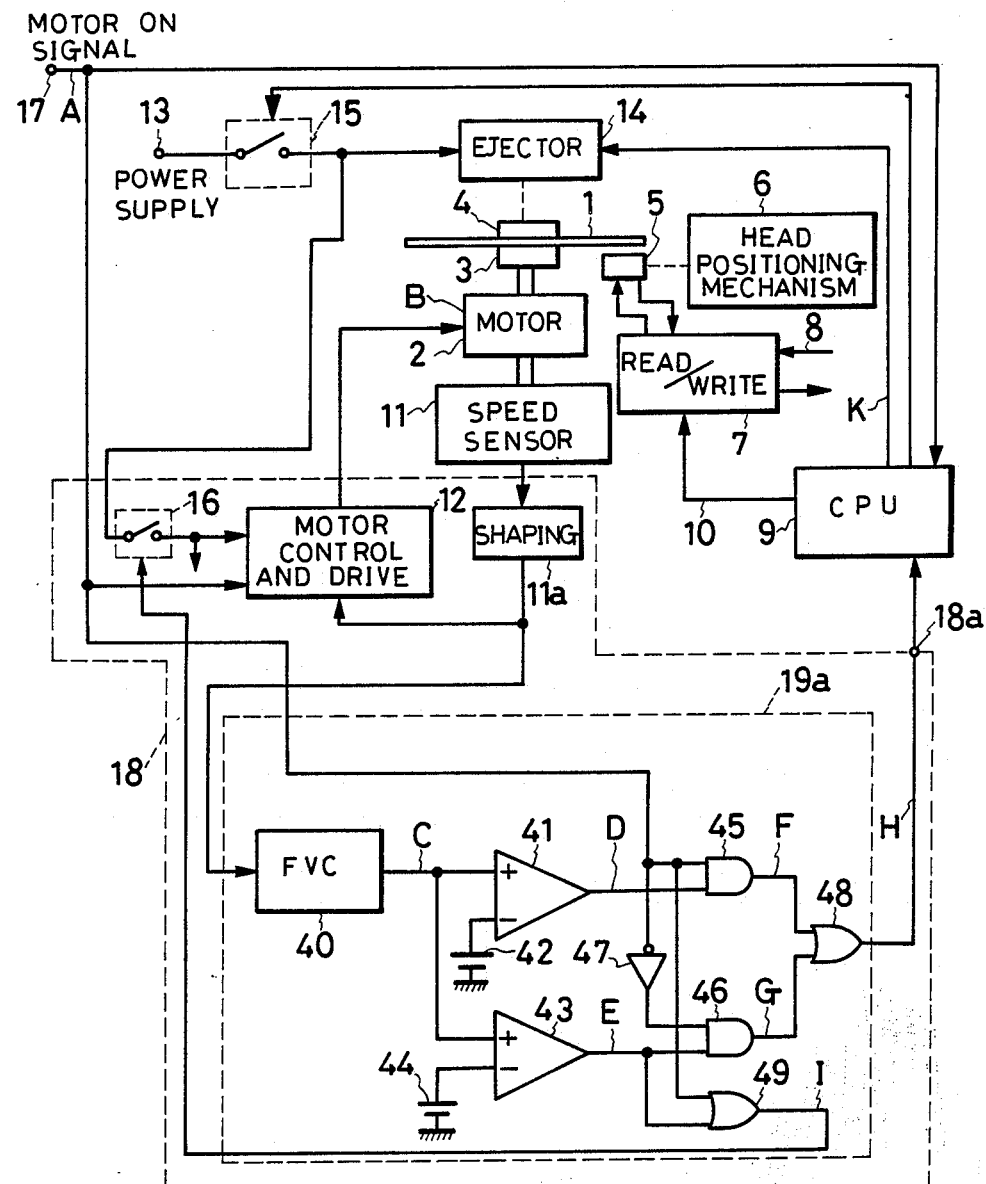
FIG. 3 is a block diagram schematically illustrating an alternative form of data transfer apparatus in accordance with my invention.

FIG. 3 shows an alternative form of data transfer apparatus in accordance with the invention, featuring a modified MOTOR STATUS signal generator circuit 19a. I will describe only this modified generator circuit 19a, it being understood that the alternative apparatus is identical with the FIG. 1 apparatus in the other details of construction. FIG. 4, consisting of (A)–(I), is a representation of the waveforms of the various signals appearing in the correspondingly designated parts of the FIG. 3 circuitry.

The modified MOTOR STATUS signal generator circuit 19a includes a frequency to voltage converter (FVC) 40 having its input coupled to the shaping circuit 11a for translating the MOTOR SPEED signal into an equivalent voltage signal of FIG. 4(C) representative of the speed of the disk drive motor 2. I have shown at FIG. 4(C) the voltage signal as being inversely proportional to the motor speed by way of example only.

The output of the FVC 40 is connected to the non inverting input of a first comparator 41, the inverting input of which is connected to a first reference voltage source 42. As will be understood from FIG. 4(C), the first reference voltage V1 is set only slightly less in absolute value than the FVC output voltage representative of the desired constant speed of rotation of the disk drive motor 2. Therefore, as shown at FIG. 4(D), the first comparator 41 will go high as at t3 and t5 when the motor speeds up to the first reference speed slightly less than the desired normal speed, and low as at t4 when the motor slows down past the first reference speed.

The output of the FVC 40 is also connected to the non-inverting input of a second comparator 43, the inverting input of which is connected to a second reference voltage source 44. FIG. 4(C) indicates that the second reference voltage V2 is set slightly more in absolute value than the zero output voltage of the FVC 40 corresponding to the nonrotation of the disk drive motor 2. It will therefore be seen from FIG. 4(E) that output from the second comparator 43 is high when motor is in rotation at above the second reference speed slightly more than zero, as from t2 to t7.

The first comparator 41 has its output connected to one of the two inputs of a first AND gate 45, the other input of which is connected to the MOTOR ON signal input terminal 17. Thus, inputting the signals of FIG. 4(A) and (D), the first AND gate 45 will provide the output which is high only when the motor is in rotation at the desired normal speed, as from t3 to t4 and from t5 to t6, as seen at FIG. 4(F).

The second comparator 43 has its output connected to one of the two inputs of a second AND gate 46, the other input of which is connected to the MOTOR ON signal input terminal 17 via a NOT circuit 47. The output from the second AND gate 46 is therefore as represented at FIG. 4(G), being high only during the braking control period of t6-t7.

The outputs from the first and second AND gates 45 and 46 are both directed into an OR gate 48. The resulting output from the OR gate 48 is the MOTOR STATUS signal represented at FIG. 4(H). This MOTOR STATUS signal is high when: (1) the disk drive motor is in constant rotation at the desired normal speed, as from t3 to t4 and from t5 to t6; or (2) the motor is under braking control, as from t6 to t7. It sill therefore be understood that the modified generator circuit 19a can provide the same MOTOR STATUS signal as that generated by the circuit 19 of FIG. 1. Inputting this MOTOR STATUS signal, together with the MOTOR ON signal from the input terminal 17, the CPU 9 performs the same control functions as set forth in connection with the FIG. 1 embodiment.

The FIG. 4(E) output from the second comparator 43 and the FIG., 4(A) MOTOR ON signal from the input terminal 17 are both directed into a second OR gate 49. Thus the second OR gate 49 produces the MOTOR OFF signal seen at FIG. 4(I). The MOTOR OFF signal is utilized as in FIG. 1 embodiment for opening the second power switch 16, and so disconnecting the motor control and drive circuit 12 from the supply terminal 13, shortly before the motor comes to a complete stop, as at t7 in FIG. 4.

POSSIBLE MODIFICATIONS

Although I have shown and described my invention in very specific aspects thereof, I do no wish my invention to be limited by the exact details of the foregoing disclosure. For example, the principles of my invention are readily adaptable for magnetic disk apparatus, in addition to for optical disk apparatus as the illustrated embodiments. The following is a brief list of additional modifications or alterations of the illustrated embodiments which I believe fall within the scope of my invention:

1. Some components of the MOTOR STATUS signal generator circuits 19 and 19a of FIGS. 1 and 3 will be unnecessary if equivalent parts in other circuits are utilized for the same purpose. For example, the flip flop 20 of the FIG. 1 circuit 19 and the FVC 40 of the FIG. 3 circuit 19a could be replaced by equivalent parts that may be included in the motor control and drive circuit 12.

2. The MOTOR SPEED signal could be obtained by sensing a mark on the disk 1 or by reading a signal recorder thereon.

3. The MOTOR ON signal could be generated internally, as by the CPU 9, instead of by the external host system.

What I claim is:

1. In an apparatus having a head for data transfer with a disklike record medium, in combination:
   (a) a disk drive motor for imparting rotation to the record medium;
   (b) speed sensor means for providing a MOTOR SPEED signal representative of the speed for rotation of the record medium.
   (c) signal supply means for supplying a MOTOR ON signal dictating the rotation and nonrotation of the disk drive motor;
   (d) motor control and drive means coupled to the signal supply means for setting the disk drive motor into rotation when the MOTOR ON signal dictates the rotation of the disk drive motor, and to the speed sensor means for driving the disk drive motor at a prescribed normal speed in response to the MOTOR SPEED signal in order to enable date transfer between the head and the record medium; and
   (e) a MOTOR STATUS signal generator circuit coupled to both the speed sensor means and the signal supply means for generating a dual implication MOTOR STATUS signal in response to the MOTOR SPEED signal and the MOTOR ON signal, the MOTOR STATUS signal having first and second prescribed states and being in:
      (1) the first prescribed state when the MOTOR ON signal dictates the rotation of the disk drive motor and when, at the same time, the disk drive motor is in rotation at a first reference speed which is substantially equal to the normal speed;
      (2) the first prescribed state when the MOTOR ON signal dictates the nonrotation of the disk drive motor and when, at the same time, the disk drive motor is in rotation at less than the first reference speed and more than a second reference speed which is less than the first reference speed;
      (3) the second prescribed state when the MOTOR ON signal dictates the rotation of the disk drive motor and when, at the same time, the disk drive motor is in rotation at less than the first reference speed;
      (4) the second prescribed state when the MOTOR ON signal dictates the nonrotation of the disk drive motor and when, at the same time, the disk drive motor is out of rotation or in rotation at not more than the second reference speed; and
      (5) the first or second prescribed state when the MOTOR ON signal dictates the rotation of the disk drive motor and when, at the same time, the disk drive motor is in rotation at more than the first reference speed.

2. The apparatus of claim 1 wherein the MOTOR STATUS signal generator circuit comprises:
   first circuit means for generating a first signal representative of the rotation of the disk drive motor at the first reference speed when the MOTOR ON signal dictates the rotation of the disk drive motor;

(b) second circuit means for generating a second signal representative of the rotation of disk drive motor at speeds between the first and second reference speeds when the MOTOR ON signal dictates the nonrotation of the disk drive motor; and (c) third circuit means for providing the MOTOR STATUS signal by combining the first and second signals.

3. The apparatus of claim 1 further comprising means coupled to both the signal supply means and the MOTOR STATUS signal generator circuit for comparing the MOTOR ON signal and the MOTOR STATUS signal in order to ascertain, when the MOTOR STATUS signal is in the first prescribed state, whether the disk drive motor is in rotation at the first reference speed or at speeds between the first and second reference speeds.

4. The apparatus of claim 1 wherein the MOTOR STATUS signal generator circuit comprises means responsive to the MOTOR SPEED signal for generating a MOTOR OFF signal for deenergizing the disk drive motor when the latter slows down to the second reference speed.

5. In an apparatus having a head for data transfer with a disklike record medium, in combination:
(a) a disk drive motor for imparting rotation to the record medium;
(b) signal supply means for supplying a MOTOR ON signal dictating the rotationand nonrotation of the disk drive motor;
(c) speed sensor means for generating a series of MOTOR SPEED pulses at time intervals inversely proportional to the speed of rotation of the record medium;
a source of clock pulses;
(e) a motor control and drive circuit coupled to both the speed sensor means and the clock pulse source for driving the disk drive motor at a prescribed normal speed by synchronizing the MOTOR SPEED pulses with the clock pulses, at least while the MOTOR ON signal dictates the rotation of the disk drive motor; and
(f) a MOTOR STATUS signal generator circuit for generating a dual implication MOTOR STATUS signal, the MOTOR STATUS signal generator circuit comprising:
(1) first circuit means coupled to both the speed sensor means and the clock pulse source for providing an output signal indicative of whether the MOTOR SPEED pulses are synchronized with the clock pulses or not;
(2) second circuit means cooupled to the speed sensor means for providing an output signal indicative of whether the disk drive motor is in rotation at more than a reference speed less than the prescribed normal speed or not; and
(3) third circuit means coupled to all of the signal supply menas and the first and second circuit means for providing the MOTOR STATUS signal in response to the MOTOR ON signal and the output signals of the first and second circuit means;
(g) the MOTOR STATUS signal having first and second prescribed states and being in:
(1) the first prescribed state when the MOTOR ON signal dictates the rotation of the disk drive motor and when, at the same time, the output signal of the first circuit means indicates the synchronization of the motor speed pulses with the clock pulses;
(2) the first prescribed state when the MOTOR ON signal dictates the nonrotation of the disk drive motor and when, at the same time, the output signal of the second circuit means indicates the rotation of the disk drive motor at more than the reference speed;
3) the second prescribed state when the MOTOR ON signal dictates the rotation of the disk drivre motor and when, at the same time, the output signal of the first circuit means indicates the nonsychronization of the motor speed pulses with the clock pulse; and
(4) the second prescribed state when the MOTOR ON signal dictates the nonrotation of the disk drive motor and when, at the same time, the output signal of the second circuit mens indicates the rotation of the disk drive motor at not more than the reference speed.

6. The apparatus of claim 5 wherein the first circuit means of the MOTOR STATUS signal generator circuit comprises:
(a) a D flip flop having a data input coupled to the speed sensor means and a clock input coupled to the clock pulse source; and
(b) a retriggerable monostable multivibrator connected between the D flip flop and the third circuit means.

7. The apparatus of claim 6 wherein the second circuit means of the MOTOR STATUS signal generator circuit comprises:
(a) a second retriggerable monostable multivibrator having an input coupled to the speed sensor means;
(b) a low pass filter connected to an output of the second monostable multivibrator;
(c) a source of a reference voltage; and
(d) a comparator having a first input coupled to the low pass filter, and a second input coupled to the reference voltage source.

8. The apparatus of claim 7 wherein the third circuit means of the MOTOR STATUS signal generator circuit comprises:
(a) a first AND gate having a first input coupled to the first recited monostable multivibrator, a second input coupled to the signal supply means, and a third input coupled to the comparator;
(b) a NOT circuit coupled to the signal supplymeans;
(c) a second AND gate having a first input coupled to the NOT circuit, and a second input coupled to the comparator; and
(d) an OR gate having a first input coupled to the first AND gate, and a second input coupled to the second AND gate, in order to provide the MOTOR STATUS signal.

9. The apparatus of claim 7 further comprising:
(a) power supply means;
(b) a power switch connected between the power supply means and the motor control and drive circuit; and
(c) an OR gate having a first input coupled to the signal supply means, a second input to the comparator of the second circuit means, and an output to the power switch;
(d) whereby the OR gate delivers a MOTOR OFF signal to the power switch for deenergizing the disk drive motor when the disk drive motor slows down to the reference speed.

10. In an apparatus having a head for data transfer with a disklike record medium, in combination:
  (a) a disk drive motor for imparting rotation to the record medium;
  (b) signal supply means for supplying a MOTOR ON signal dictating the rotation and nonrotation of the disk drive motor;
  (c) speed sensor means for generating a MOTOR SPEED signal representative of the speed of rotation of the record medium;
  (d) a motor control and drive circuit coupled to the speed sensor means for driving the disk drive motor at a prescribed normal speed in response to the MOTOR SPEED signal at least while the MOTOR ON signal dictates the rotation of the disk drive motor; and
  (e) a MOTOR STATUS signal generator circuit for generating a dual implication MOTOR STATUS signal, the MOTOR STATUS signal generator circuit comprising:
    (1) a converter for translating the MOTOR SPEED signal into an equivalent voltage signal;
    (2) a source of a first reference voltage representative of a first reference speed substantially equal to the prescribed normal speed of the disk drive motor;
    (3) a first voltage comparator coupled to both the converter and the first referenace voltage source for comparing the voltage signal with the first reference voltage and providing an output signal indicative of whether the speed of the disk drive motor is less than the first reference speed or not;
    (4) a source of a second reference voltage representative of a second reference speed which is less than the first reference speed;
    (5) a second voltage comparator coupled to both the converter and the second reference voltage source for comparing the voltage signal with the second reference voltage and providing an output signal indicative of whether the speed of the disk drive motor is less than the second reference speed or not; and
    (6) circuit means coupled to all of the signal supplly means and the first and second voltage comparators for providing the MOTOR STATUS signal in response to the MOTOR ON signal and the output signals of the first and second comparators;
  (f) the MOTOR STATUS signal having first and second prescribed states and being in:
    (1) the first prescribed state when the MOTOR ON signal dictates the rotation of the disk drive motor and when, at the same time, the output signal of the first voltage comparator indicates the rotation of the disk drive motor at not less than the first reference speed;
    (2) the first prescribed state when the MOTOR ON signal dictates the nonrotation of the disk drive motor and when, at the same time, the output signal of the second voltage comparator indicates the rotation of the disk drive motor at not less than the second reference speed;
    (3) the second prescribed state when the MOTOR ON signal dictates the rotation of the disk drive motor and when, at the same time, the output signal of the first voltage comparator indicates the rotation of the disk drive motor at less than the first reference speed; and
    (4) the second prescribed state when the MOTOR ON signal dictates the nonrotation of the disk drive motor and when, at the same time, the output signal of the second voltage comparator indicates the rotation of the disk drive motor at less than the second reference speed.

11. The apparatus of claim 10 wherein the circuit means of the MOTOR STATUS signal generator circuit comprises:
  (a) a first AND gate having a first input coupled to the signal supply means, and a second input coupled to the first voltage comparator;
  (b) a NOT circuit coupled to the signal supply means;
  (c) a second AND gate having a first input coupled to the NOT circuit, and a second input coupled to the second voltage comparator; and
  (d) an OR gate having a first input coupled to the first AND gate, and a seacond input coupled to the second AND gate, in order to provide the MOTOR STATUS signal.

12. The apparatus of claim 10 furthr comprising:
  (a) power supply means;
  (b) a power switch connected between the power supply means and the motor control and drive circuit; and
  (c) an OR gate having a first input coupled to the signal supply means, a second input to the second voltage comparator, and an output to the power switch;
  (d) whereby the OR gate delivers a MOTOR OFF signal to the power switch for deenergizing the disk drive motor when the disk drive motor slows down to the second reference speed.

13. A data transfer apparatus for use with a replaceable record disk, comprising:
  (a) a turntable on which a record disk is to be mounted for joint rotation therewith;
  (b) a head for data transfer with the record medium on the turntable;
  (c) ejector for dismounting the record disk from the turntable;
  (d) a disk drive motor coupled to the turntable for imparting rotation to the record disk;
  (e) speed sensor means for providing a MOTOR SPEED signal representative of the speed of rotation of the record disk;
  (f) signal supply means for supplying a MOTOR ON signal dictating the rotation and nonrotation of the disk drive motor;
  (g) a motor control and drive circuit coupled to the signal supply means for setting the disk drive motor into rotation when the MOTOR ON signal dictates the rotation of the disk drive motor, and to the speed sensor means for driving the disk drive motor at a prescribed normal speed in response to the MOTOR SPEED signal in order to enable date transfer between the head and the record medium;
  (h) a MOTOR STATUS signal generator circuit coupled to both the speed sensor means and the signal supply means for generating a dual implication MOTOR STATUS signal in response to the MOTOR SPEED signal and the MOTOR ON signal, the MOTOR STATUS signal having first and second prescribed states and being in:
    (1) the first prescribed state when the MOTOR ON signal dictates the rotation of the disk drive motor and when, at the same time, the disk drive motor is in rotation at a first reference speed which is substantially equal to the normal speed;

(2) the first prescribed state when the MOTOR ON signal dictates the nonrotation of the disk drive motor and when, at the same time, the disk drive motor is in rotation at less than the first reference speed and more than a second reference speed which is less than the first refrence speed (3) the second prescribed state when the MOTOR ON signal dictates the rotation of the disk drive motor and when, at the same time, the disk drive motor is in rotation at less than the first reference speed;

(4) the second prescribed state when the MOTOR ON signal dictates the nonrotation of the disk drive motor and when, at the same time, the disk drive motor is out of rotation or in rotation at not more than the second reference speed; and (5) the first or second prescribed state when the MOTOR ON signal dictates the rotation of the disk drive motor and when, at the same time, the disk drove motor is in rotation at more than the first reference speed; and (i) a processor responsive to the MOTOR STATUS signal for actuating the ejector when the disk drive motor slows down to the second reference speed while the MOTOR ON signal dictates the nonrotation of the disk drive motor.

14. The apparatus of claim 13 further comprising:
(a) power supply means; and
(b) a power switch connected between the power supply means and the ejector;
(c) the processor being responsive to the MOTOR STATUS signal for opening the power switch after actuating the ejector when the disk drive motor slows down to the second reference speed while the MOTOR ON signal dictates the nonrotation of the disk drive motor.

15. The apparatus of claim 14 further comprising:
(a) a second power switch connected between the first reciter power switch and the motor control and drive circuit; and
(b) means included in the MOTOR STATUS signal generator circuit for generating a MOTOR SPEED signal, generator response to the MOTOR SPEED signal, the MOTOR OFF signal being applied to the second power switch for opening the same when the disk drive motor slows down to the second reference speed while the MOTOR ON signal dictates the nonrotation of the disk drive motor.

* * * * *

UNITED STATES PATENT AND TRADEMARK OFFICE
CERTIFICATE OF CORRECTION

PATENT NO. : 4,918,743

DATED : April 17, 1990

INVENTOR(S) : Hiroshi Tsuyuguchi

Page 1 of 2

It is certified that error appears in the above-identified patent and that said Letters Patent is hereby corrected as shown below:

Col. 1, line 21, after "moment." delete the next sentence which does not read as it should be in the patent application. "The so called READY signal indicates disk rotation at the normal speed. the WRITE GATE permits writing on th disk." and insert the following:

--The so called READY signal has so far been used for this purpose in flexible magnetic disk apparatus and in fixed disk apparatus. As the READY signal indicates disk rotation at the normal speed, the WRITE GATE permits writing on the disk.--

Col. 3, line 29, correct the spelling of "unmoudlated" to --unmodulated--.

Col. 3, line 51, correct the spelling of "prosvided" to --provided--.

Col. 3, line 52, "11a" the --a-- should be underlined.

Col. 5, line 54, correct the spelling of "mannual" to --manual--.

Col. 6, line 41, after "2(I)" the next sentence should start a new paragraph .

Col. 9, line 33, correct the spelling of "sill" to --will--.

Col. 11, line 29, "rotationand" should be --rotation and--.

line 35, paragraph --(d)-- is missing before "a source of clock pulses".

UNITED STATES PATENT AND TRADEMARK OFFICE
CERTIFICATE OF CORRECTION

PATENT NO. : 4,918,743
DATED : April 17, 1990
INVENTOR(S) : Hiroshi Tsuyuguchi

It is certified that error appears in the above-identified patent and that said Letters Patent is hereby corrected as shown below:

line 52, correct the spelling of "cooupled" to --coupled--.

line 58, correct the spelling of "menas" to --means--.

Col. 12, line 48, "supplymeans" should be --supply means--.

Col 13, line 43, correct the spelling of "supplly" to --supply--.

Col. 14, line 28, correct the spelling of "seacond" to --second--.

line 21, correct the spelling of "furthr" to --further--.

line 41, before "ejector" the parenthesis (c) should be inserted.

Signed and Sealed this

Twenty-second Day of December, 1992

Attest:

DOUGLAS B. COMER

Attesting Officer      Acting Commissioner of Patents and Trademarks